(12) United States Patent
Krauss et al.

(10) Patent No.: US 8,047,478 B1
(45) Date of Patent: Nov. 1, 2011

(54) MODULAR POST SYSTEM WITH HOLES ON MULTIPLE AXIAL PLANES

(76) Inventors: Kurt F. Krauss, Grants Pass, OR (US); Eddie Keith Mosttler, Central Point, OR (US)

(*) Notice: Subject to any disclaimer, the term of this patent is extended or adjusted under 35 U.S.C. 154(b) by 0 days.

(21) Appl. No.: 12/841,459

(22) Filed: Jul. 22, 2010

(51) Int. Cl.
*F16L 3/00* (2006.01)

(52) U.S. Cl. ........................................ 248/121; 211/182

(58) Field of Classification Search .................. 211/196, 211/205, 107, 197, 182; 248/121, 125.7, 248/354.5, 357, 188.5, 159, 200.1
See application file for complete search history.

(56) References Cited

U.S. PATENT DOCUMENTS

| | | | | |
|---|---|---|---|---|
| 1,089,290 | A | * | 3/1914 | Thompson ..................... 248/165 |
| 1,266,749 | A | * | 5/1918 | Abbott ........................... 211/205 |
| 1,471,909 | A | * | 10/1923 | Miller ............................ 211/187 |
| 3,207,511 | A | | 9/1965 | Hoffman |
| 3,310,180 | A | * | 3/1967 | Neagle ........................... 211/205 |
| 3,814,416 | A | | 6/1974 | Munger et al. |
| 3,893,776 | A | | 7/1975 | Beattie |
| 3,969,871 | A | | 7/1976 | Ewers |
| 3,982,754 | A | | 9/1976 | de Moreau |
| 4,775,349 | A | | 10/1988 | Short et al. |
| 5,156,507 | A | | 10/1992 | Underbrink |
| 5,351,926 | A | * | 10/1994 | Moses ......................... 248/354.5 |
| 5,554,074 | A | | 9/1996 | Von Parrish |
| 5,575,580 | A | | 11/1996 | Parrish et al. |
| 6,095,950 | A | | 8/2000 | Katz |
| 6,227,752 | B1 | | 5/2001 | Friedrich |
| 6,302,824 | B1 | | 10/2001 | MacAdam et al. |
| 6,575,652 | B2 | | 6/2003 | Krauss |
| 6,971,528 | B2 | * | 12/2005 | Chen ............................. 211/182 |
| 2003/0089830 | A1 | * | 5/2003 | Loughman ................. 248/125.7 |
| 2004/0002394 | A1 | | 1/2004 | Heipp et al. |
| 2006/0186073 | A1 | * | 8/2006 | Roe et al. ...................... 211/196 |
| 2008/0061020 | A1 | * | 3/2008 | Kaisler .......................... 211/196 |

* cited by examiner

*Primary Examiner* — Ramon Ramirez
(74) *Attorney, Agent, or Firm* — Jerry Haynes Law

(57) ABSTRACT

A modular post system, in some versions, includes an exterior post extending along a central axis. The exterior post may be composed of multitude of tube segments that are coupled with each other to form the exterior post. In some cases, each tube segment may have at least four holes arranged in a ring about the central axis. The holes are configured to allow the mounting of articles, such as playground equipment, to the post system. Thus, the exterior post may have a multitude of rings with the rings being located in axial planes a fixed distance apart along the central axis. The tube segments have interior surfaces from which ribs protrude, to define an internal channel of the exterior post. An internal core post may be partly located within the internal channel. A fastening mechanism may secure the coupled tube segments to the internal core post.

22 Claims, 13 Drawing Sheets

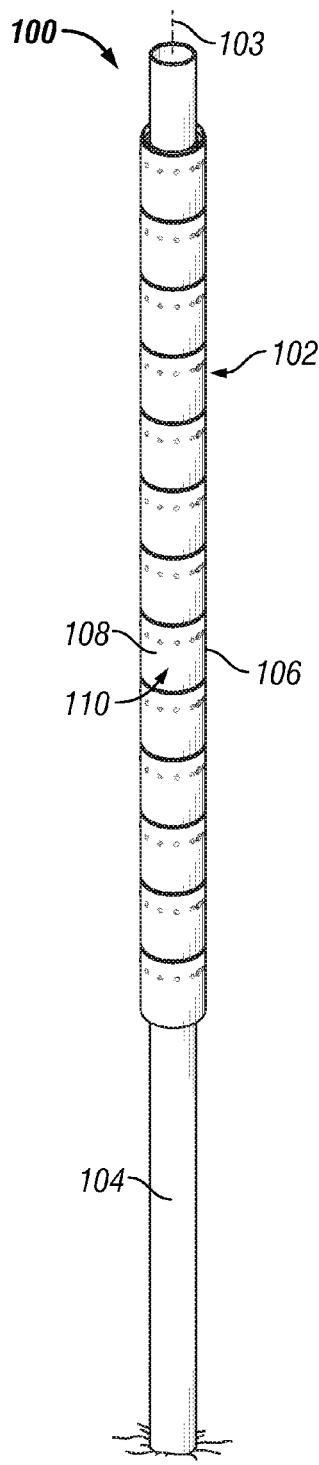
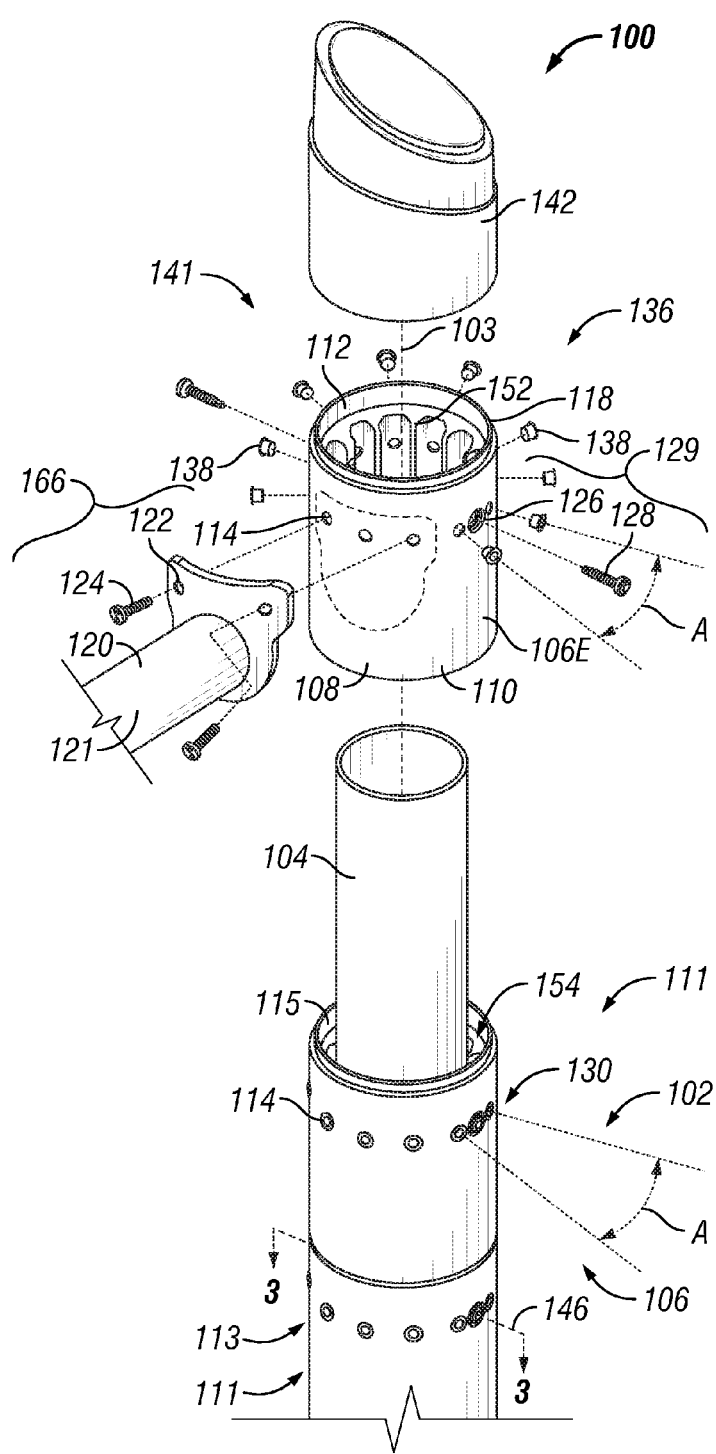
FIG. 1
FIG. 2

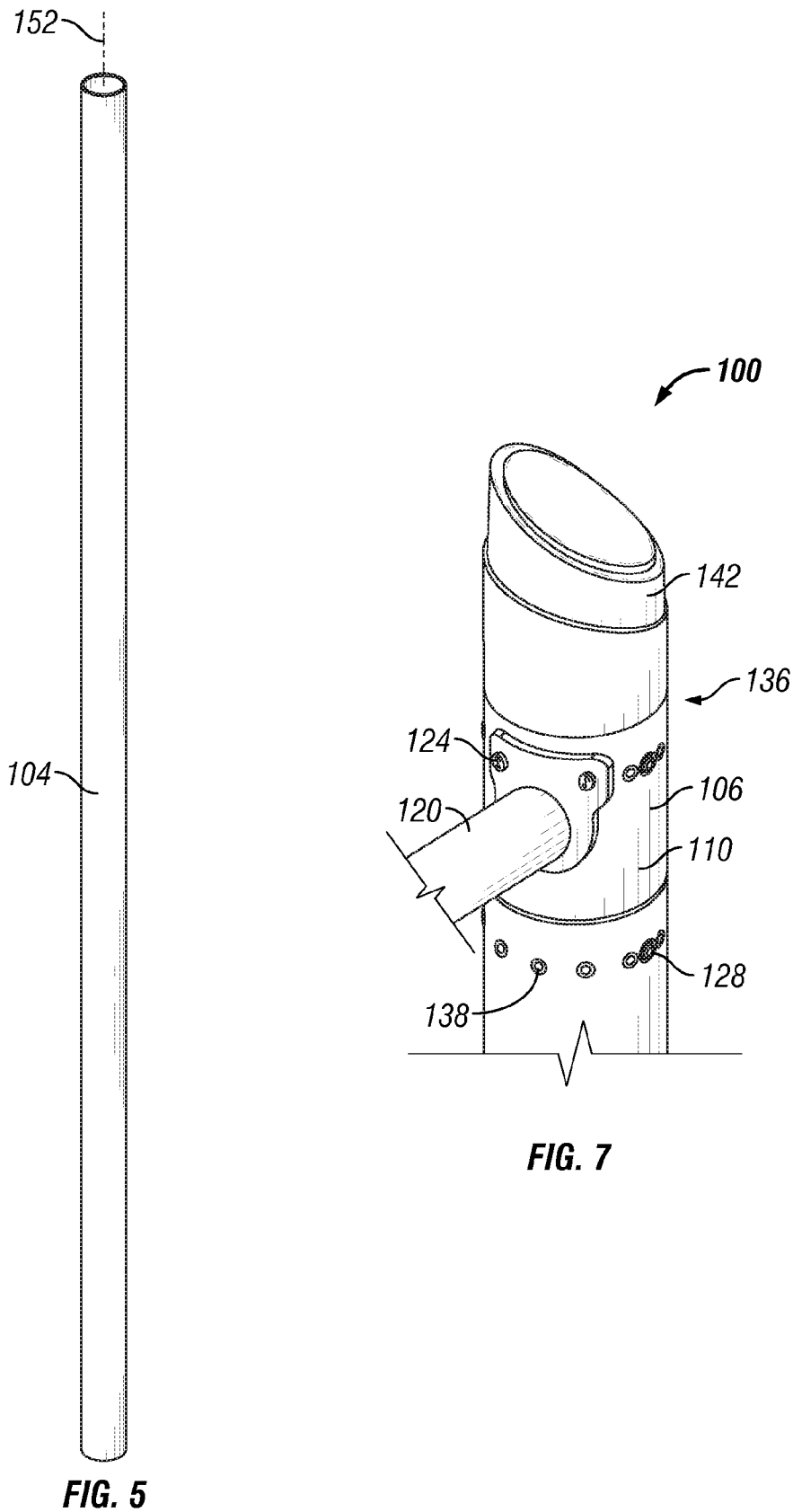

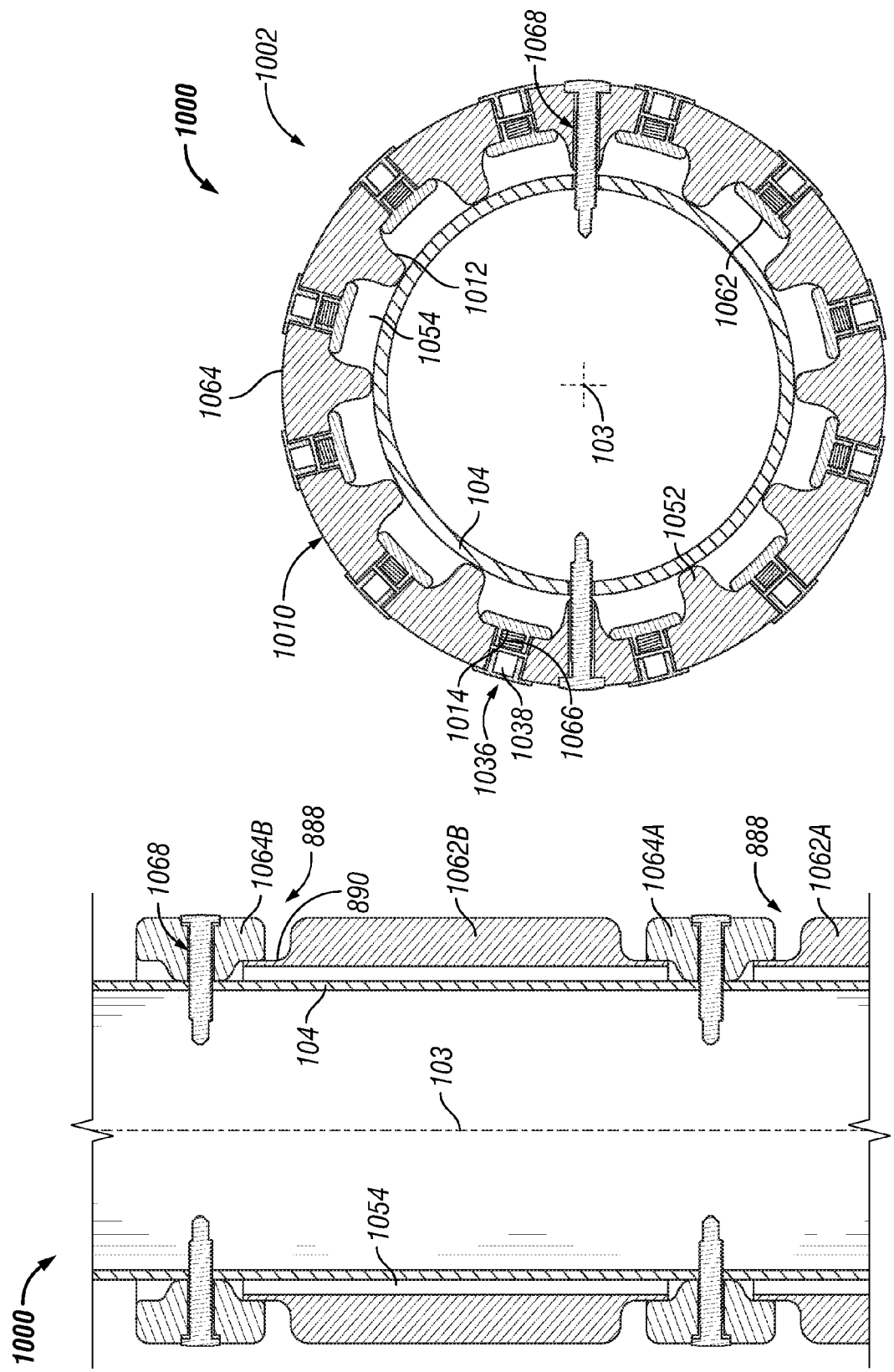

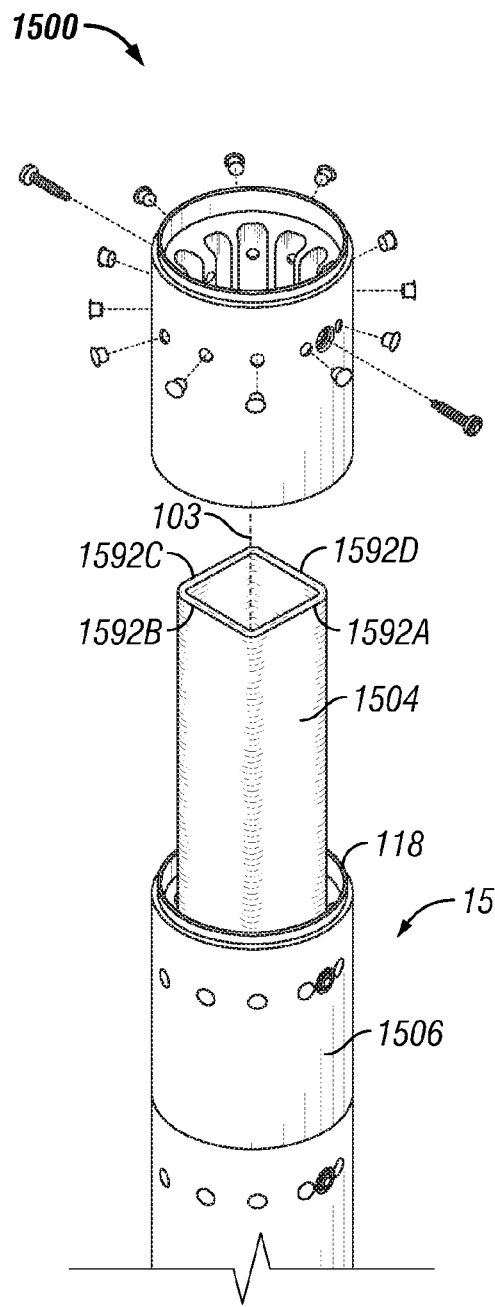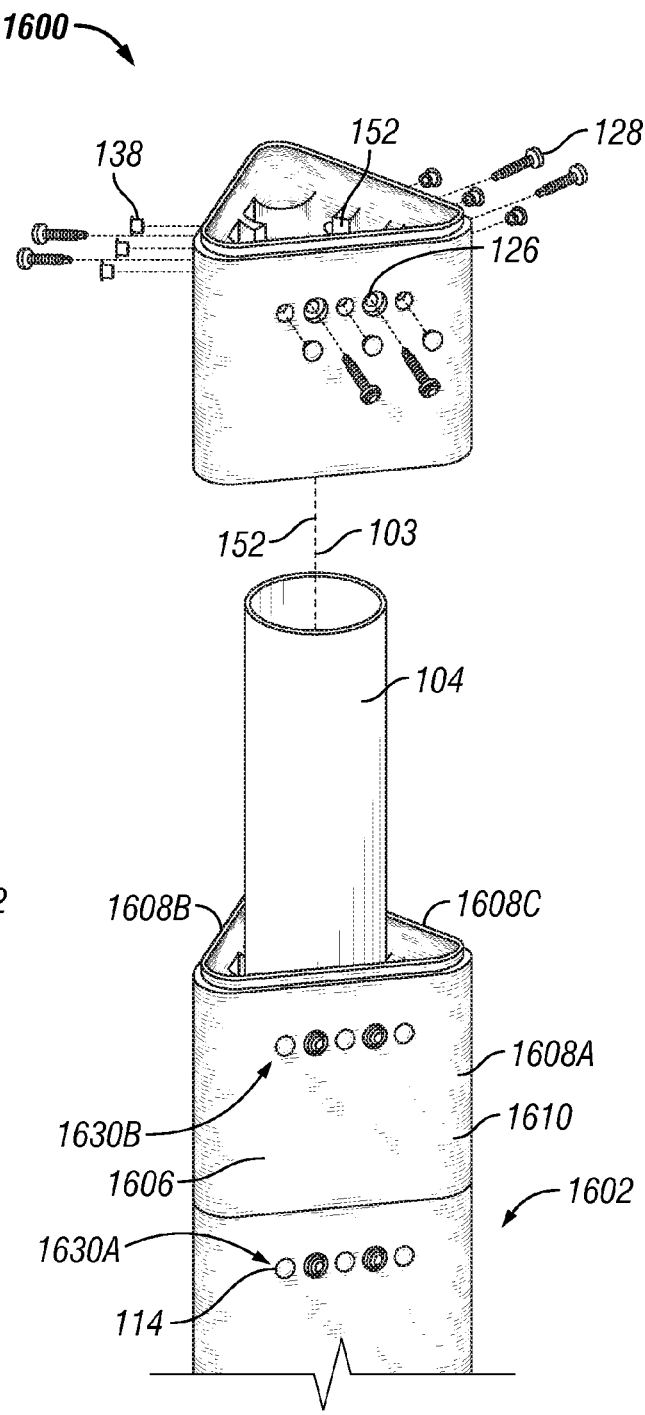
FIG. 15
FIG. 16

MODULAR POST SYSTEM WITH HOLES ON MULTIPLE AXIAL PLANES

FIELD OF THE INVENTION

This invention generally relates to a post system. More specifically, this invention relates to a modular post system with holes on multiple axial planes.

BACKGROUND OF THE INVENTION

Posts are often used to attach articles to. For example, a playground may have several posts to which various types of playground equipment are attached. This playground equipment may include decks, slides, climbers, traverses, monkey bars, and other equipment. Attaching articles to posts sometimes includes challenges. For example, it may be necessary to drill holes in a post for purposes of attaching an article. Also, some articles must be attached to two or more posts, preferably at the same elevation. Careful measuring when drilling holes may be necessary to assure that the article is mounted to the posts at the same elevation.

Some posts may come from the manufacturer with pre-drilled holes. But when designing a post with pre-drilled holes, various design considerations may present themselves.

One possible design consideration is optimizing the placement of holes at a given elevation on a post. That is, one design consideration is how many pre-drilled holes to provide a user at a given elevation on the post.

Another possible design consideration may be how holes at various elevations on a post are organized for ease of use by a user.

Another possible design consideration is whether a post requires assembly and how difficult that assembly is.

Yet another possible design consideration may be the structure of a post and how strong it is.

SUMMARY

In some embodiments, a post system includes an exterior post. The exterior post has an exterior wall that extends lengthwise about a central axis. The exterior wall of the exterior post defines a multitude of holes. The multitude of holes is arranged in at least three rings, with each ring defining a perimeter about the central axis. Each ring is within a separate axial plane—that is, a plane that is perpendicular to the central axis.

In some further embodiments, the separate axial planes are spaced a fixed distance apart along the central axis. In some embodiments, the holes comprising at least one of the rings are equally spaced along the perimeter defined by the ring.

In some embodiments, the exterior post comprises tube segments that are coupled with one another to form the exterior post. In a further embodiment, a given tube segment has one of the at least three rings of holes.

In some embodiments, the post system further comprises an internal core post extending lengthwise. In some embodiments, the tube segments have an interior surface and ribs protruding from the interior surface that collectively define an internal channel of the exterior post. In further embodiments, the internal core post is partly disposed within the internal channel and is centered about the central axis of the exterior post by the ribs.

In some embodiments, the post system further comprises a bracket and a fastening mechanism that fastens the bracket to a hole of the exterior post.

BRIEF DESCRIPTION OF THE DRAWINGS

Certain embodiments of the invention may be understood by reference to the following detailed description read with reference to the accompanying drawings.

FIG. 1 is a perspective drawing of a post system, showing an interior core post and an exterior post, the exterior post comprising tube segments with holes arranged in separate axial planes, in accordance with some embodiments.

FIG. 2 is a detailed exploded, perspective drawing of the post system of FIG. 1, showing an exploded view of an end-cap and of a bracket, in accordance with some embodiments.

FIG. 5 is a perspective drawing of an internal core post in accordance with some embodiments.

FIG. 7 is a perspective drawing of a top portion of the post system of FIG. 2, showing the exterior post with an attached end-cap and attached bracket, in accordance with some embodiments.

FIG. 11 is a cross-sectional drawing of a portion of the post system of FIG. 10, showing a cross-section along a vertical plane that includes the central axis of the post, in accordance with some embodiments.

FIG. 12 is a cross-sectional drawing of the post system of FIG. 10, showing a cross-section along an axial plane that is orthogonal to the central axis of the post system, in accordance with some embodiments.

FIG. 15 is a partially exploded perspective view of a portion of a post system, showing a tube segment with a circular-shaped opening and an interior core post with a square-shaped opening, in accordance with some embodiments.

FIG. 16 is a partially exploded perspective view of a portion of post system, showing a tube segment with a triangular-shaped opening and an interior core post with a circular opening, in accordance with some embodiments.

DETAILED DESCRIPTION

Figure 2A:
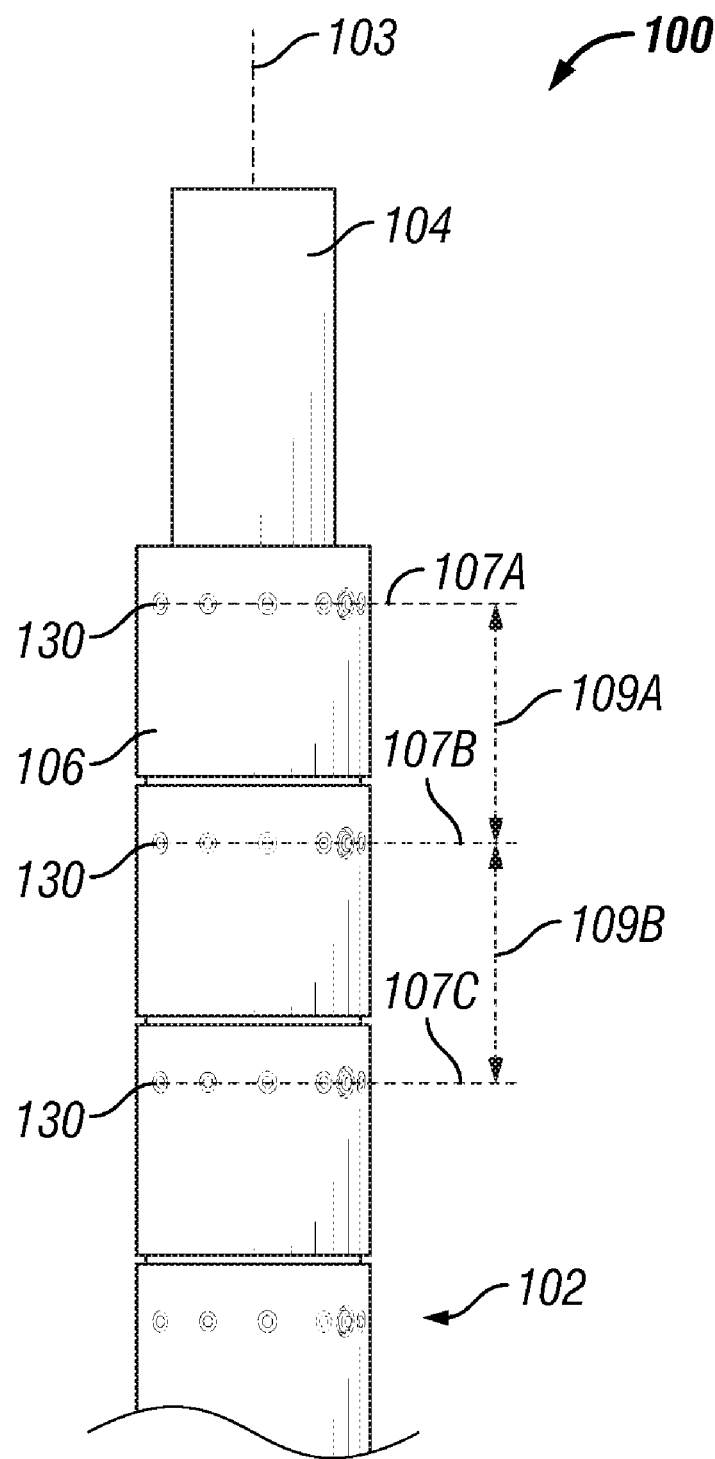
FIG. 2A is a further perspective drawing of the post system of FIG. 1, showing that the separate axial planes are a fixed distance apart along a central axis of the post system, in accordance with some embodiments.

In the following description, various embodiments are described with reference to the various drawings. As a preliminary note before turning to the description, with reference to the drawings, some clarification is offered regarding terminology used in the description.

When multiple statements are made regarding "some embodiments", these "some embodiments" may or may not be the same sets of embodiments. Similarly, when multiple statements are made about "one embodiment," these statements may not be referring to the same embodiment. Also, unless the context indicates otherwise, the singular includes the plural.

As used herein, the term wall has its usual meaning and also includes the meaning of "side." For example, a square ring includes a ring with four walls (i.e., sides). A triangular ring includes a ring with three walls (i.e., sides). A circular ring includes a ring that has only one wall (i.e., one side). Similarly, a tube segment may be circular about a central axis (i.e., a cylinder) and have only one wall (i.e., side). Or a tube segment may be square about a central axis and have four walls (i.e., four sides). A tube segment may have four walls about the axis (and be square or rectangular), may have three walls about the axis (and be triangular) and so on. As used herein, the term tube segment does not, without more, imply a cylindrical shape.

Referencing FIG. 1, in some embodiments a post system 100 includes an exterior post 102 and an interior core post 104. As shown in FIG. 1, in some embodiments, exterior post 102 and interior core post 104 are configured to allow interior core post 104 to be partially disposed within exterior post 102, with both aligned about a central axis 103. Thus assembled, the post system 100, exterior post 102, and interior core post 104 are all aligned about central axis 103. In some embodiments, exterior post 102 comprises a plurality of tube segments 106 that are configured to be coupled with one another to form the exterior post 102.

Figure 4:
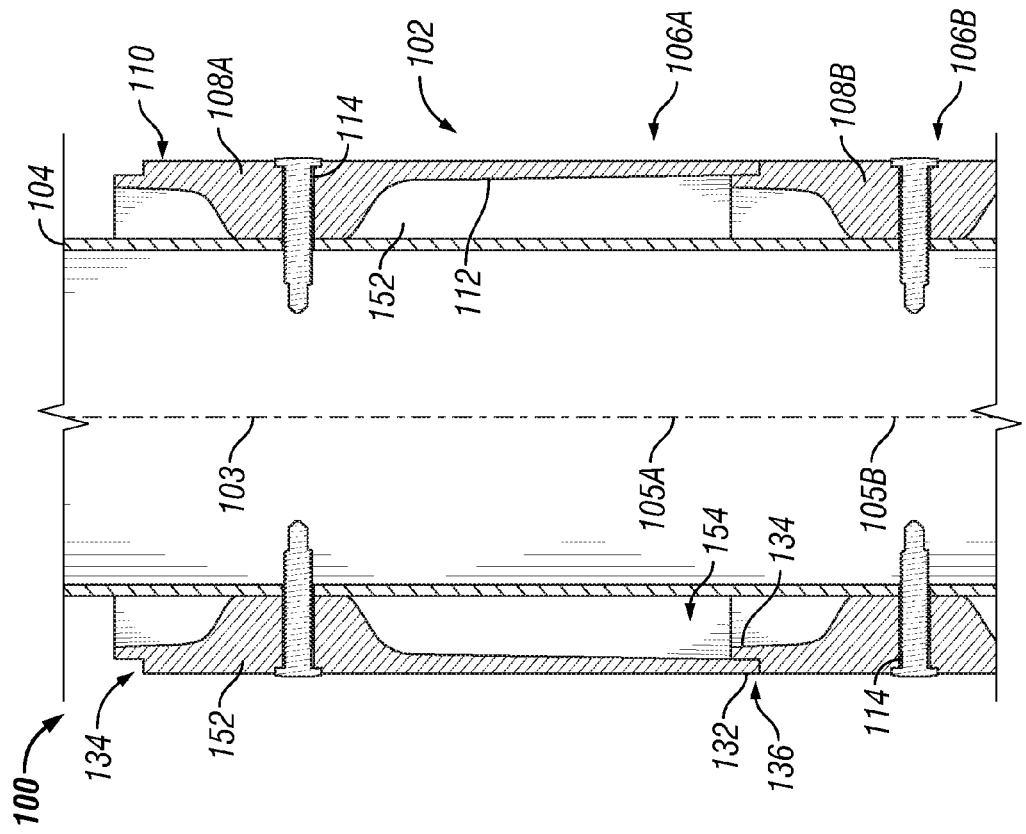
FIG. 4 is a cross-sectional drawing of a portion of the post system of FIG. 1, showing a cross-section of the post system along a vertical plane that includes the central axis of the post system, in accordance with some embodiments.

Looking ahead with reference to FIG. 4, a portion of post system 100 is seen in cross-section along a vertical plane that includes central axis 103. Cross-sections of tube segments 106A and 106B are shown. In particular, a coupling mechanism 136 for coupling tube segments 106A and 106B is shown. In this embodiment, coupling mechanism 136 is a locating ring that includes an upper lip 132 of tube segment 106A and a lower lip 134 of tube segment 106B. Upper lip 132 and lower lip 134 are configured to mate to couple tube segment 106A to tube segment 106B.

In other embodiments, coupling mechanism 136 may not be a locating ring. Instead, coupling mechanism 136 could be any means known in the art for coupling two tubes or pipe-like structures with one another. For example, in one embodiment, coupling mechanism 136 may comprise threads configured to allow tube segments 106A, 106B to be threaded together. In some embodiments, tube segments 106A, 106B may be coupled with each other via an intermediary structure, such as a gasket (See, gasket 150, FIG. 13). Direct connection between tube segments 106A, 106B is not required.

Further referencing FIG. 4, tube segments 106A and 106B have respective walls 108A and 108B that extend along and define a perimeter (e.g., 108 of FIG. 1) about respective first axis's 105A, 105B. In FIG. 4, first axis's 105A and 105B are aligned, and the same as, central axis 103. The first axis's 105A, 105B of tube segments 106A, 106B, respectively, are only aligned with central axis 103 because post system 100 is shown as fully assembled, with tube segments 106A, 106B coupled with one another by coupling mechanism 136 to form a portion of exterior post 102. When post system 100 is not assembled, then first axis's 105A, 105B may not align either with each other or with central axis 103.

Further referencing FIG. 1, in the embodiment shown, the tube segments 106 are cylinders. A cylinder has only one wall 108 (i.e. side) that wraps around a first axis (e.g., first axis's 105A, 105B of FIG. 4) and defines the cylinder. But other embodiments, as discussed below, include non-cylindrical tube segments of different geometric shapes and multiple walls or sides.

In some embodiments, the walls 108 of the tube segments 106 each comprise an exterior surface 110 with reference their respective first axis's (e.g., first axis's 105A, 105B of FIG. 4).

Referencing FIG. 2, a portion of post system 100 of FIG. 1 includes a portion of exterior post 102 and internal core post 104. The portion of exterior post 102 includes tube segments 106, including 106E which is shown in an exploded view. The other tube segments 106 are shown in a fully assembled state.

In some embodiments, post system 100 includes end cap 142 coupled with tube segment 106E at an end 141 of exterior post 102, the end 141 being defined along the length of the central axis 103. End cap 142 is coupled with tube segment 106E with coupling mechanism 136, which in this embodiment is a locating ring. In one embodiment, end cap 142 is a die cast aluminum cap with powder coat finish. In one embodiment, end cap 142 is made of plastic or other materials. In different embodiments, end cap 142 may use a variety of shapes—including having an attached roof or other ornamental post topper.

In some embodiments, post system 100 further includes bracket 120, which is affixed to exterior surface 110 of tube segment 106E by a fastening mechanism 166. Bracket 120 is discussed more fully below.

In some embodiments, the tube segments 106 extend along and define a perimeter 118 about their respective first axis's (e.g., first axis's 105A, 105B, of FIG. 4), which align with central axis 103 when the tube segments 106 are coupled with one another. The walls 108 of tube segments 106 each respectively define an interior surface 112 with respect to their respective first axis's (e.g., first axis's 105A, 105B, of FIG. 4).

When the tube segments 106 are coupled with one another, the interior surfaces 112 of the tube segments 106 face the central axis 103 of the exterior post 102 and, collectively, define interior surface 115 of exterior post 102. Further, when tube segments 106 are assembled into exterior post 102, the respective exterior surfaces 110 of tube segments 106 define exterior surface 113 of exterior post 102 and their respective walls 108 define wall 111 of exterior post 102.

In some embodiments, wall 111 of exterior post 102 (collectively walls 108 of tube segments 106), defines a plurality of channels (or holes) 114. Channels 114 are arranged within at least three rings 130. Each of the at least three rings 130 defines a perimeter 118 about the central axis 103. In some embodiments, the at least three rings are disposed at fixed intervals along the central axis 103 within respective axial planes (See axial planes 107A, 107B, 107C of FIG. 2A) that are orthogonal to the central axis.

In some embodiments, each ring has at least four channels 114. In some embodiments, each ring has at least twelve channels 114. In some embodiments the channels of a given ring 130 are equally spaced about the ring 130.

In some embodiments, the walls 108 of each of tube segment 106 defines a plurality of at least four channels 114 arranged within at least one ring 130. The tube segments 106 are capable of being coupled together to form the exterior post 102 about the central axis 103, with the at least one rings 130 being disposed about the central axis 103. In some embodiments, for each tube segment 106, each ring 130 of the at least one rings 130 is disposed in an axial plane (e.g., axial planes 107A-C of FIG. 2A) orthogonal to the central axis 103 of the external post 102. In some embodiments, the walls 108 of each tube segment 106 define at least twelve channels 114 in a given ring 130 of the at least one rings 130, and the channels 114 are spaced within the given ring 130 about the respective first axis (e.g., first axis's 105A, 105B of FIG. 4), 30 degrees apart.

The channels 114 are configured for coupling an article (e.g., bracket 120, FIG. 2) to their respective tube segments 106. In one embodiment, the channels are ⅜-16 NC threads for receiving ⅜-16 stainless steel bolts (e.g., bolts 124). In one embodiment, Loctite sealant is used to secure the bolts 124 to the channels 114.

In some embodiments, all the channels 114 of a given ring 130 are equally spaced along the ring 130. For example, two neighboring channels 114 of a ring 130 on an axial plane (e.g., axial planes 107A-C of FIG. 2A), may define angle A, with the apex of angle A on the central axis 103 within the axial plane. In one embodiment, there are twelve equally spaced channels 114 about a ring 130. Any two of the twelve equally spaced channels are 30 degrees apart along the ring 130.

In the embodiment of FIG. 2, the tube segments 106 are cylinders and the rings 130 are therefore circular. But in other embodiments, the tube segments are not cylinders, and have other shapes (e.g., square, rectangular, triangular, etc.). In these other embodiments, the rings are not circular, but instead have other shapes (e.g., square, rectangular, triangular, etc.). The perimeter 118 may also have a non-circular shape (e.g., square, rectangular, triangular, etc.).

Moving forward with reference to FIG. 2A, in some embodiments post system 100 comprises an external wall 102 comprising tube segments 106. Three tube segments 106 each comprise a plurality of at least four channels 114, the plurality being disposed within at least one ring 130. In one embodiment, each ring 130 is disposed on one of parallel axial planes 107A, 107B, 107C that are orthogonal to central axis 103. In one embodiment, these axial planes 107A, 107B, 107C are at fixed intervals (e.g., distances) apart along the central axis 103. For example, axial planes 107A and 107B are separated by interval 109A and axial planes 107B and 107B are separated by interval 109B. Further, the length of interval 109A is equal to that of interval 109B. In one embodiment, the interval between the rings 130 of channels 114 is six inches.

Further referencing FIG. 2, some embodiments further comprise a plurality of fastening mechanisms to secure the assembled tube segments 106 (and thus, exterior post 102) to interior core post 104. In some embodiments, at least three fastening mechanisms 129 fasten the interior core post 104 to at least three tube segments 106. In the embodiment shown, fastening mechanism 129 includes channel 126 (defined by wall 108) and mounting screw 128. In a further embodiment, the mounting screw 128 is a self-drilling stainless steel screw and the interior core post 104 has no pre-drilled holes to receive the self-drilling screw. In a particular further embodiment, mounting screw 128 is a ¼"—14 self-drilling tamper resistant stainless steel screw. By securing the tube segments 106 to the internal core post 104, the fastening mechanism 129 reinforces the coupling of the tube segments 106 with one another.

In some embodiments, bracket 120 is shaped or configured to be mounted to exterior surface 110 of tube segment 106E or to exterior surface 113 of exterior post 102. In some embodiments, bracket 120 defines at least one bracket channel 122 that extends through at least a portion of bracket 120. The at least one bracket channel 122 is capable of being aligned with at least one channel 114 of tube segment 106E or of exterior post 102. This alignment is indicated by the dotted line that runs through bracket channel 122 and channel 114. The alignment occurs when bracket 120 is mounted to exterior surface 110 of tube segment 106E or to exterior surface 113 of exterior post 102. In the embodiment shown, bracket 120 comprises two bracket channels 122.

Bracket fastening mechanism 166 is configured to affix bracket 120 to the exterior surface 110 of tube segment 106E or to exterior surface 113 of the external post 102. The affixing occurs when bracket 120 is mounted to exterior surface 110 of tube segment 106E or to exterior surface 113 of exterior post 102. In the embodiment shown, bracket fastening mechanism 166 comprises channel 114 (an internally threaded hole), bracket channel 122, and externally-threaded bolt 124. The path of bolt 124 through bracket channel 122 and into channel 114 is illustrated in FIG. 2 with a dotted line. In one embodiment, channel 114 is a hole threaded with ⅜-16 NC threads. In one embodiment, bolt 124 is a stainless steel tamper resistant button head bolt with ⅜-16 threads. In a one embodiment, bracket channel 122 has a diameter of ⁷⁄₁₆ inches. In some embodiments, the bracket 120 is indirectly connected with the exterior surface 110. In some embodiments, the head of bolt 124 is indirectly connected with bracket 120. For example, in some embodiments, the fastening mechanism 166 may further comprise a washer.

A variety of materials may be used for bracket 120, including die cast aluminum with low corrosion characteristics, brass, or other materials. In one embodiment, bracket 120 is formed from ¼" thick steel with a powder coat finish. Bracket 120 has an arm 121 for connecting to playground equipment and other articles. In one embodiment, bracket arm 121 has a 5 inch diameter and may be coupled with playground equipment by welding or other well-known methods.

In some embodiments, plugs 138 are inserted into channels 114 that are not in use. In one embodiment, plug 138 is a ⁵⁄₁₆ inch plastic snap-in plug. In one embodiment, the head of plug 138 is low-profile to resist snagging.

Figure 3:
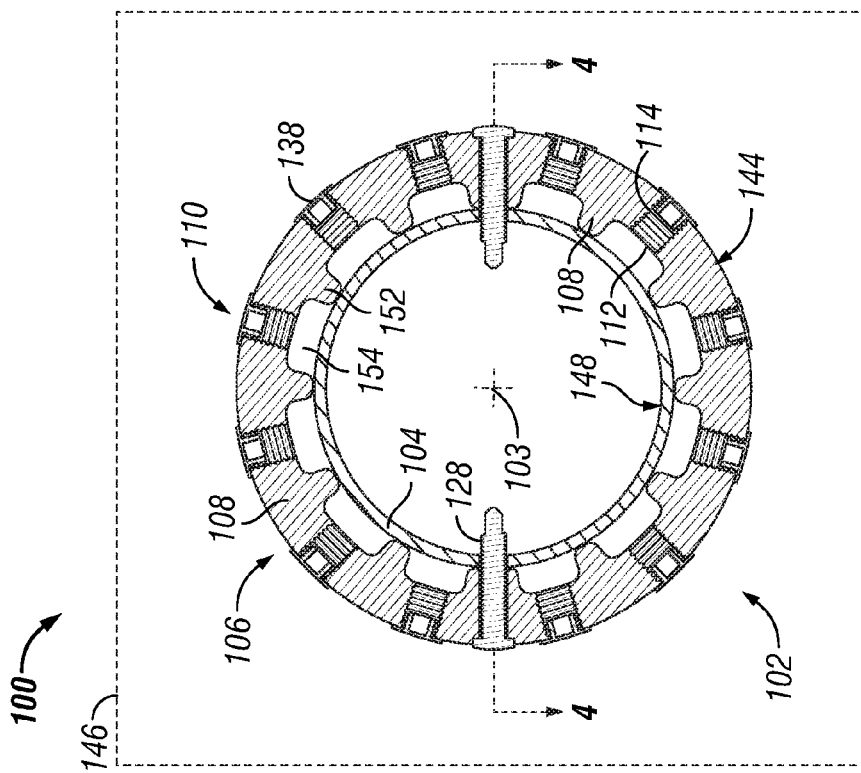
FIG. 3 is a cross-sectional drawing of a portion of the post system of FIG. 1, showing a cross-section of the post system along an axial plane that is orthogonal to the central axis of the post system, in accordance with some embodiments.

Referencing FIG. 3, post system 100 is shown in cross-section along axial plane 146. The location of axial, cross-sectional, plane 146 is indicated in FIG. 2. Axial plane 146 is orthogonal to central axis 103. In the embodiments shown in FIGS. 1 through 4, tube segments 106 and internal core post 104 are cylinders. Thus, in the embodiment shown in FIG. 3, exterior surface 110 of wall 108 of tube segment 106 defines a circular shape 144 in cross-sectional plane 146. In one embodiment, internal core post 104 defines a circular shape 148 in cross-sectional plane 146.

In one embodiment, the tube segments 106 are cylinders having an outer diameter about the central axis of 5 inches. In one embodiment, internal core post 104 is an elongated cylinder and has an outer diameter about the central axis of 3½ inches.

Wall 108 of tube segment 106 has an interior surface 112 facing the central axis 103. A multitude of ribs 152 protrude from interior surface 112. Referencing FIG. 2, in some embodiments all tube segments 106 have interior surfaces 112 with ribs 152 protruding from their respective interior surfaces 112. That is, the ribs 152 protrude from the respective interior surfaces 112 of the walls 108 of the respective tube segments 106. When the tube segments 106 are coupled with one another as shown in FIGS. 1 through 4, the ribs 152 collectively define an internal channel 154 of external post 102.

At least a portion of the internal core post 104 is configured and sized to be partly disposed within the internal channel 154 of exterior post 102 (See internal core post of FIG. 1, partly disposed within exterior post 102). Ribs 152 are shaped to center the portion of the interior core post 104 within the internal channel 154 and about the central axis 103.

Ribs 152 also add strength to tube segments 106. In some embodiments, the shape and height of the ribs is based on using the least amount of material, while making the ribs long enough and wide enough to center the internal core post 104 and to achieve necessary strength for the tube segments 106.

In the embodiment shown in FIG. 3, the ribs 152 are a part of tube segments 106 that protrude from the interior surfaces 112 of the tube segments 106. In alternative embodiments, the ribs 152 are separate structures that are coupled with the interior surfaces 112 of the tube segments 106.

In one embodiment, the tube segments 106 are made of die cast aluminum with low corrosion characteristics. In a further embodiment, the tube segments 106 are made of die cast aluminum and the aluminum is polished aluminum. In one embodiment, the tube segment 106 is powder coated. In one embodiment, the tube segments are made from plastic. In one embodiment, the internal core post is 11 gauge galvanized steel tubing. In one embodiment, the internal core post 104 is made of aluminum tubing with a ⅛ inch wall. In one embodiment, the internal core post is powder coated. In other embodiments, different materials, coatings, dimensions, and various combinations of these are used.

Further referencing FIG. 3, in some embodiments channels 114 are internally threaded. In one embodiment, channel 114 is a hole threaded with ⅜-16 NC threads. In one embodiment, it receives a bolt (i.e., bolt 124 of FIG. 2). In one embodiment, channel 114 receives a bolt that is a stainless steel tamper resistant button head bolt with ⅜-16 threads. As discussed above, in some embodiments, channels that are not being used are plugged with plugs 138. Further, mounting screws 128 secure tube segment 106 to internal core post 104.

Post system 100 is sectioned vertically by a cross-sectional plane (indicated by the numeral 4 in FIG. 3) that includes central axis 103. This cross-section is shown in FIG. 4.

Once again referencing FIG. 4, internal core post 104 is partly disposed within internal channel 154 of exterior post 102. As discussed with reference to FIG. 3, ribs 152 center the internal core post 104 about central axis 103 and about first axis's 105A, 105B (when the tube segments 106 are assembled to form external post 102). Coupling mechanism 136 includes upper lip 132 of tube segment 106A and lower lip 134 of tube segment 106B. FIG. 4 also shows lower lip 134 of tube segment 106A, but does not show the mating lip of the other neighboring tube segment.

Referencing FIG. 5, a particular embodiment of internal core post 104 extends along its length along axis 152. In some embodiments, when internal core post is partly disposed within an internal channel of an exterior post (i.e., post 102 of FIG. 1), then axis 152 aligns with and is the same as central axis 103 (e.g., central axis 103 of FIG. 1).

Figure 6:
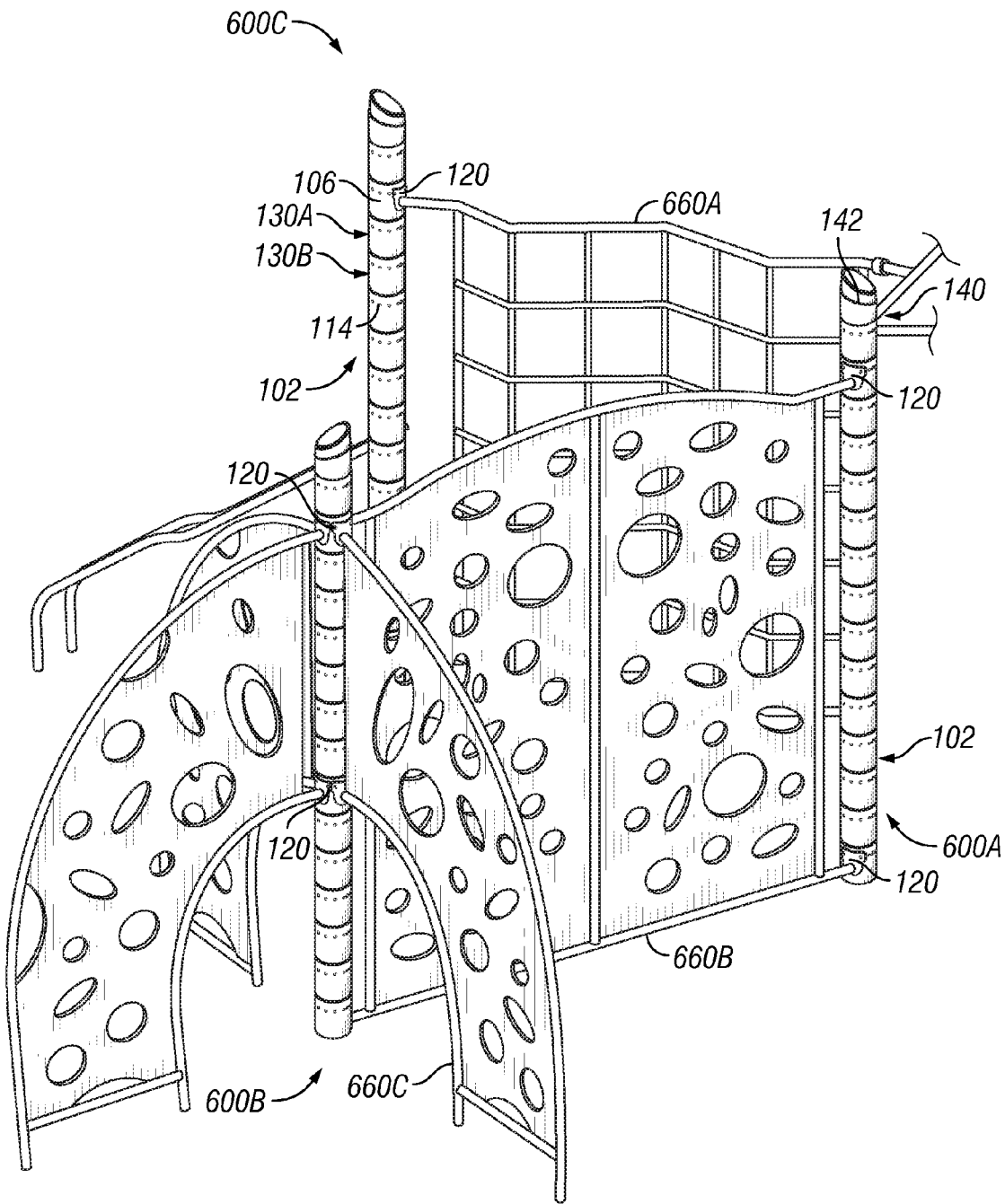
FIG. 6 is a perspective drawing of a plurality of post systems and playground equipment, showing playground equipment attached to post systems via brackets, in accordance with some embodiments.

Referencing FIG. 6, a multitude of post systems 600A, 600B, 600C, are coupled with playground accessories, such as playground accessories 660A, 660B, and 660C. In the post system embodiments shown, the play ground accessories are coupled with the post systems with two or more brackets 120. For example, climber 660C is coupled with post system 600B via two brackets 120.

FIG. 6 also illustrates how the post systems 600A, 600B, 600C offer a playground installer multiple locations to mount a bracket 120 and a playground accessory (i.e., 660A). For example, post system 600C comprises exterior post 102 with channels 114 organized into at least rings 130A, 130B, among many. Playground accessory 660A is shown coupled with post system 600C at tube segment 106 via bracket 120. The number of holes in the various rings 130 and the number of rings 130 provides a multitude of locations to affix a play accessory to a post system.

Referencing FIG. 7, a partial close-up of post system 100 is shows end cap 142 and bracket 120 fully assembled. End cap 142 is coupled with tube segment 106 via coupling mechanism 136. In one embodiment, coupling mechanism 136 is a locating ring. Bracket 120 is coupled with the exterior surface 110 of tube segment 106, in part via bolt 124. Also shown are mounting screw 128 and a plug 138 for a channel (not shown).

Figure 8:
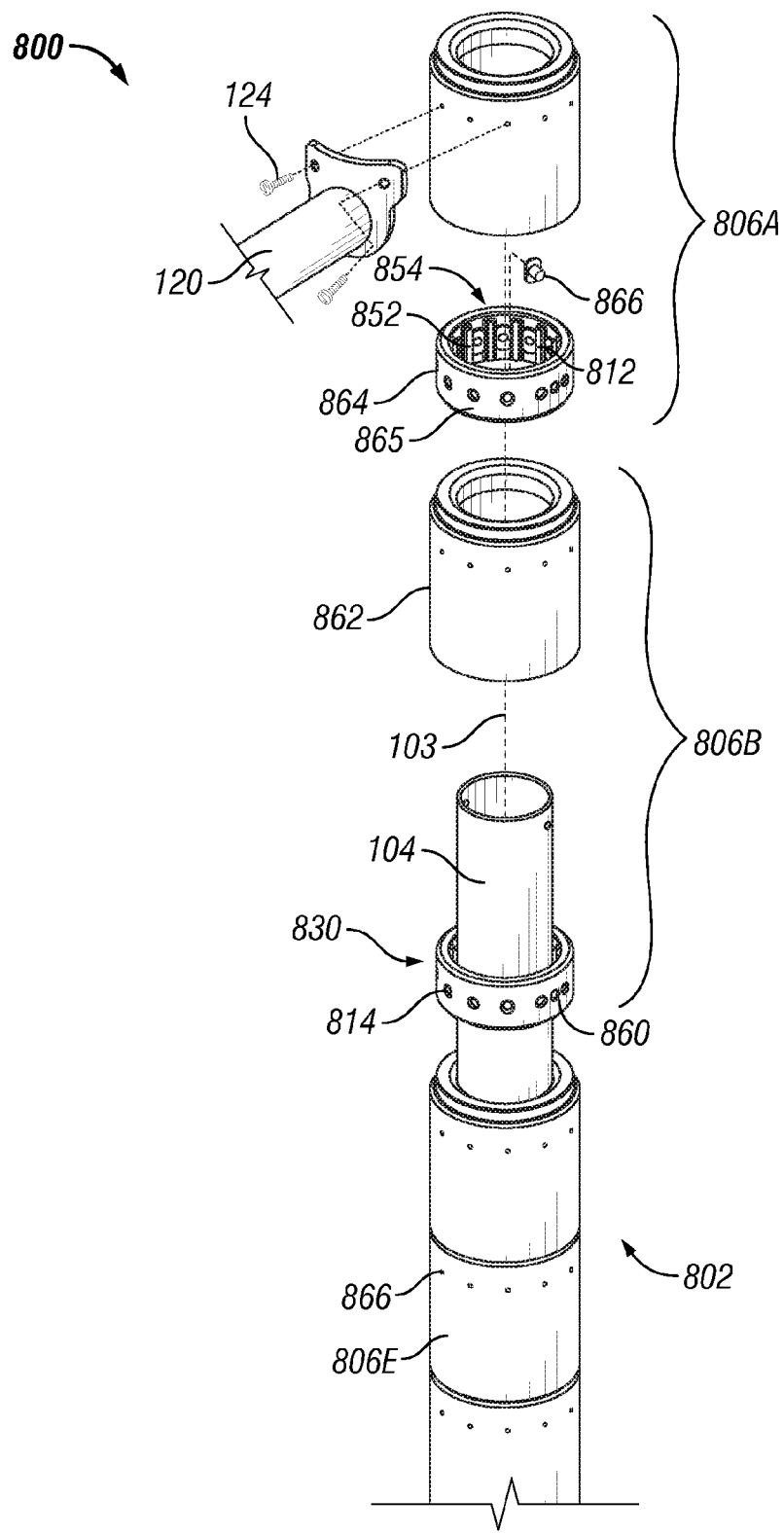
FIG. 8 is an exploded, perspective drawing of a portion of a post system, showing an interior core post and tube segments that each comprise a mounting ring and a sleeve, in accordance with some embodiments different from those of FIG. 1.

Referencing FIG. 8, a portion of a post system 800 comprises an internal core post 104 and an external post 802. Internal core post 104 is configured to be partially disposed within external post 802 about central axis 103 to form post system 800. External post 802 comprises tube segments 806. Tube segments 806A, 806B each comprise a sleeve 862 and a mounting ring 864 that are capable of being coupled with one another to form their respective tube segment 806. The interior surface 112 (not shown) of a tube segment 806 includes interior surface 812 of mounting ring 864. The interior surface 812 of mounting ring 864 faces central axis 103.

Ribs 852 protrude from internal surface 812. Tube segments 806A 806B are configured to be coupled with one another to form a portion of external post 802 about the central axis 103. The tube segments 806A and 806B are configured to be coupled together, resulting in the ribs 852 defining a portion of internal channel 854 of exterior post 802.

Internal core post 104 is configured and shaped to be partly disposed within internal channel 854 of exterior post 802. The ribs 852 are to center internal core post 104 within internal channel 854 and about central axis 103.

Mounting ring 864 defines a plurality of at least four channels 814 within a ring 830. When tube segments 806A 806B are coupled together to form exterior post 802 about central axis 103, the ring 830 defines a perimeter 118 about central axis 103.

Channels 814 are configured for attachment of an article (e.g., bracket 120 of FIG. 2) to exterior surface 865 of mounting ring 864. Unlike channels 114 of FIGS. 2 and 3, channels 814 are not internally threaded, but instead have T-nuts 866, which are internally threaded, inserted in the channels, with the head of the T-nut resting on the interior surface 812 of mounting ring 864.

Figure 8A:
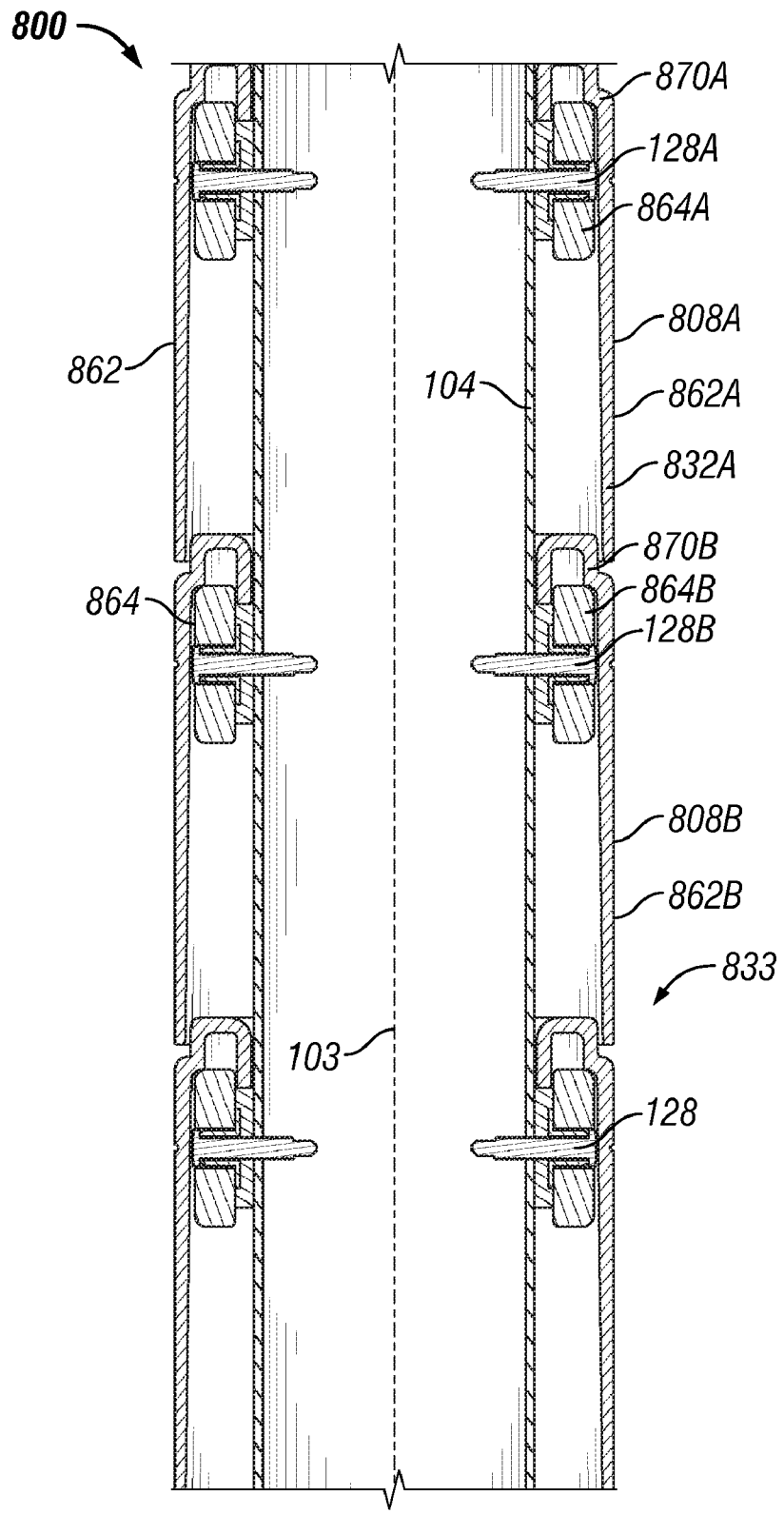
FIG. 8A is a cross-sectional drawing of a portion of the post system of FIG. 8, showing a cross-section of the post along a vertical plane that includes the central axis of the post, in accordance with some embodiments.

Referencing FIG. 8A, a portion of post system 800 is cross-sectioned along a vertical plane that includes central axis 103. This portion of post system 800 is shown fully assembled. Sleeves 862A and 862B have walls 808A and 808B, respectively, that cover mounting rings 864A and 864B. In addition, L-shaped bends 870A and 870B, which are portions of walls 808A and 808B respectively, block motion by mounting rings 864A and 864B beyond bends 870A and 870B respectively. Further, internal core post 104 is disposed within internal channel 854 (See, 854, FIG. 8). The combination of walls 808A and 808B and the presence of interior core post 104 block any movement by mounting rings 864A, 864B orthogonal to central axis 103. Finally, mounting screws 128A and 128B are drilled through mounting rings 864A and 864B and into interior core post 104 to prevent all movement by mounting rings 864A and 864B.

Further, at least a portion of sleeves 862A, 862B separate mounting ring 864A from 8674B. In the embodiment shown, the wall 808A of sleeve 862A and the coupling mechanism, in particular bend 870B, separate 862A from 862B.

Sleeves 862A and 862B are coupled together by coupling mechanism 833. In one embodiment, coupling mechanism 833 includes upper lip 832A of sleeve 862A and bend 870B of sleeve 862B. Bend 870B provides a recessed area that upper lip 832A engages to couple sleeves 862A and 862B.

Further referencing FIG. 8, sleeve 806E covers its respective mounting ring with the mounting ring not being visible from the exterior of post system 800. Sleeve 866, has center points 866, which indicate where channels 814 of mounting ring 864 are located. In some embodiments, all channel 814 locations are marked by center points 866. In some embodiments, sleeve 866 is made of plastic. Therefore, an installer would pick the desired hole location based on the location of a center point 866, and drill the thin layer of plastic of the sleeve 862 to reveal the desired channel 814 of the hidden mounting ring 864.

In some embodiments, the tube segments are configured to be assembled with rings 130 of at least four channels 114 in different mounting rings 864. These rings define respective perimeters about the central axis and spaced apart along the central axis at fixed intervals. In some embodiments, the rings are disposed in separate axial planes (See axial planes 107A-C of FIG. 2) orthogonal to the central axis.

Figure 9:
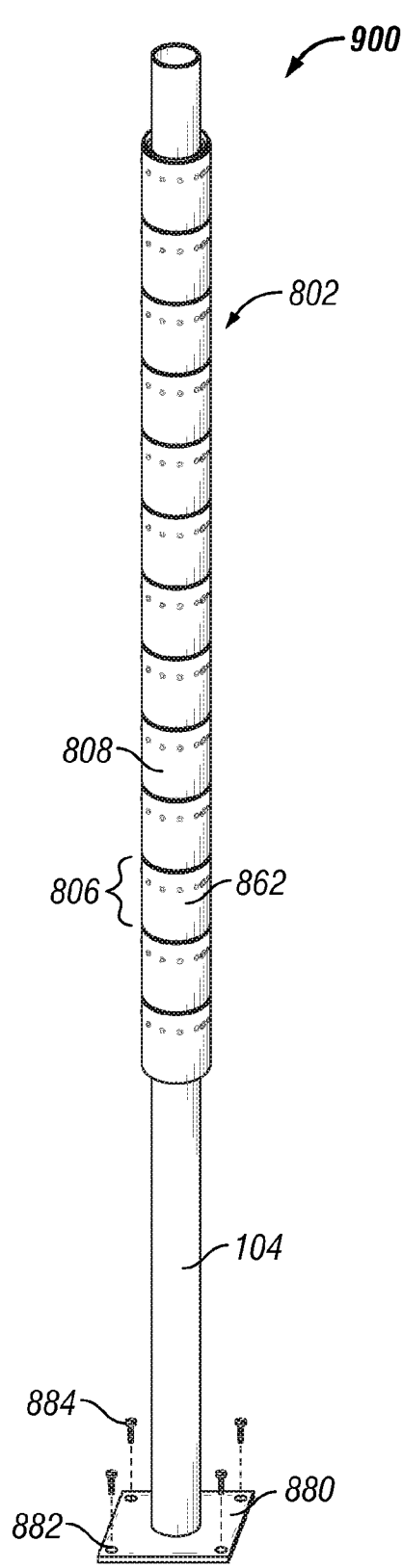
FIG. 9 is a perspective drawing of an assembled post system similar to that shown in FIG. 8, but further showing a surface mount plate affixed to the bottom end of the interior core post, in accordance with some embodiments.

Referencing FIG. 9, this is another view of an embodiment similar to that discussed with reference to FIGS. 8 and 8A. The only significant difference is that post system 900 has a surface mount plate 880 coupled with the bottom end (the end that stands on the ground) of internal post 104. The surface mount plate can be coupled with the bottom end by any of several widely used methods, including welding.

Surface mount plate 880 has channels 882 and bolts 884 for securing with the ground. In some embodiments, the ground surface is concrete and channels for the bolts 884 must be drilled into concrete.

Figure 10:
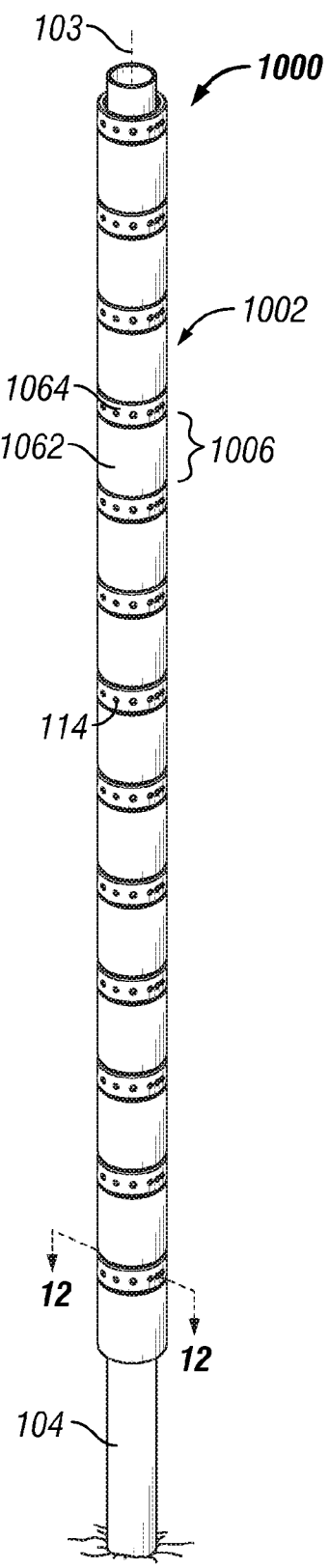
FIG. 10 is a perspective drawing of an assembled post system, showing tube segments that each comprise a mounting ring and a sleeve, in accordance with embodiments different from those of FIGS. 1 and 8.

Referencing FIG. 10, a post system 1000 comprises an internal core post 104 and an external post 1002. Internal core post 104 is configured to be partially disposed within external post 1002 about central axis 103 to form post system 1000. External post 1002 comprises tube segments 1006. In some embodiments, at least two tube segments 1006 comprise a mounting ring 1064 and a sleeve 1062. The mounting rings 1064 comprise channels 114 and rings 130 of channels, as discussed relative to FIGS. 1 through 4.

Post system 1000 is similar to post system 800 in that mounting ring 1064 and sleeve 1062 are configured to be coupled with one another to form exterior post 1002 about axis 103. Post system 1000 differs from post system 800 primarily in that 1) sleeves 1062 do not cover the mounting rings 1064; and 2) an exterior view of the post system 1000 shows alternating sleeves 1062 and mounting rings 1064.

Referencing FIG. 11, a cross-section along a vertical plane that includes axis 103 shows mounting rings 1064A and 1064B. Also shown are sleeves 1062A and 1062B. The sleeves 1062A and 1062B are coupled with one another via coupling mechanism 888. The coupling mechanism includes a lower lip 890 of sleeve 10628 that slides under mounting ring 1064B. Further, internal core post 104 is disposed within internal channel (i.e., 1054, FIG. 12). A mounting screw 1068 is disposed through the mounting ring (e.g., 1064B) and into the internal core 104—thus fixing the location of the mounting ring (e.g., 1064B) relative to both internal core post 104 and central axis 103.

Referencing FIG. 12, post system 1000 is cross-sectioned by an axial plane at a mounting ring 1064. Internal core 104 shows a circular shape in the axial plane. Similarly, the exterior surface 1010 of mounting ring 1064 shows a circular shape in the axial plane.

Twelve channels are shown in this embodiment, each with fastening mechanism 1036 to fasten articles (e.g., bracket 120) to the exterior surface 1010 of the mounting ring 1064. In some embodiments, the fastening mechanism includes an internally treaded t-nut 1066 whose head is trapped in the interior chamber 1054 of external post 1002. The fastening mechanism 1036 also includes an externally-threaded bolt (not shown, e.g., bolt 124 of FIG. 2) that threads into the trapped t-nut 1066. Plastic caps 1038 fill unused channels 1014.

As discussed above relative to FIG. 11, mounting screws pierce the mounting rings 1064 and the internal core post 104.

Further, ribs 1052 protrude from the internal surface 1012 of mounting rings 1064 to define an internal channel 1054 that the internal core post 104 may be partly disposed within. The ribs 1052 center the internal core post 104 within the internal channel 1054 and about the central axis 103.

Figure 13:
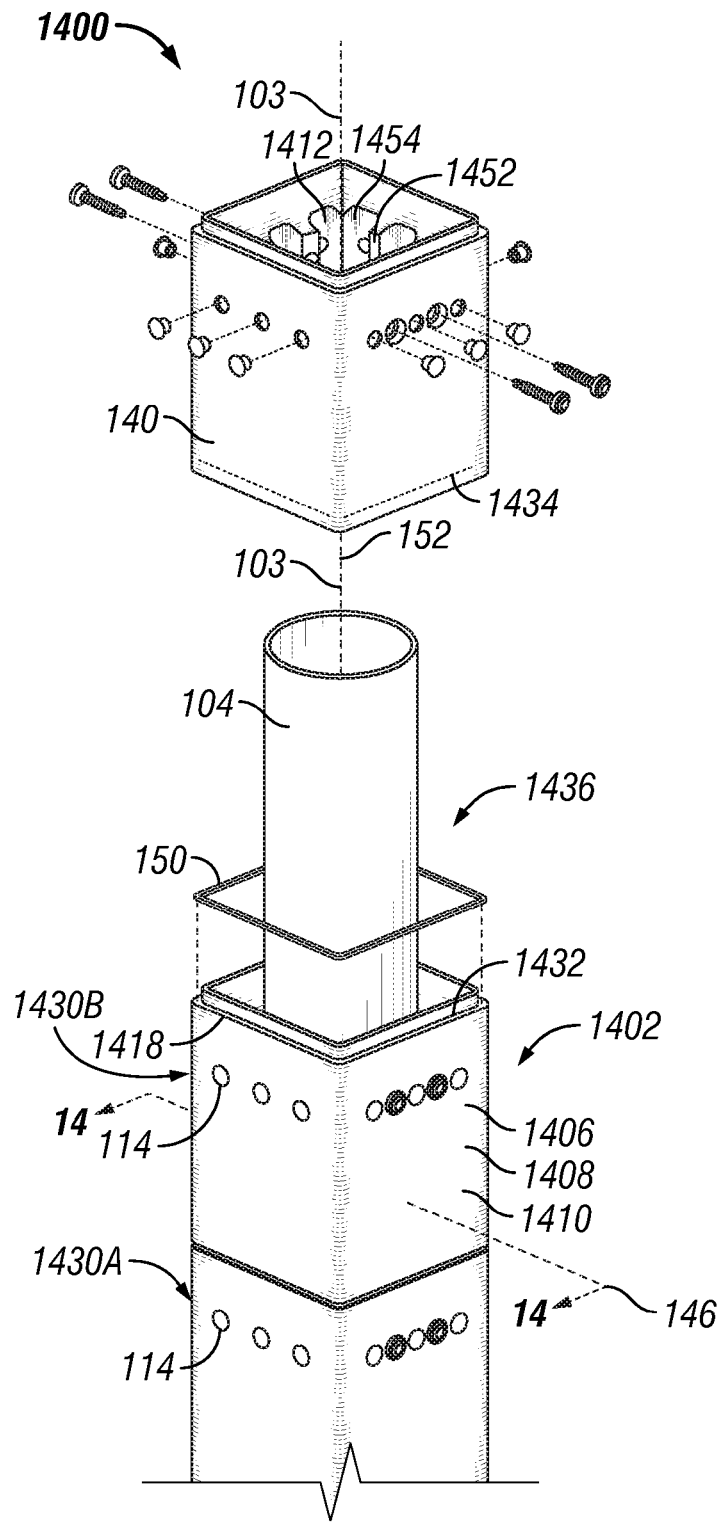
FIG. 13 is a perspective view of a post system, showing a tube segment with a square-shaped opening, a gasket, and an interior core post with a circular opening, in accordance with some embodiments.

Referencing FIG. 13, a post system 1400 includes an internal core post 104 and an external post 1402. Internal core post 104 is configured to be partially disposed within external post 1402 about central axis 103 to form post system 1400. External post 1402 comprises tube segments 1406.

With the tube segments 1406 coupled to one another to form external post 1402 and central axis 103 and with the internal core post 104 partly disposed in internal channel (internal channel 1454 of FIG. 14), a tube segment 1406 is cross-sectioned by axial plane 146, which is orthogonal to central axis 103. The resulting view is shown in FIG. 14.

Figure 14:
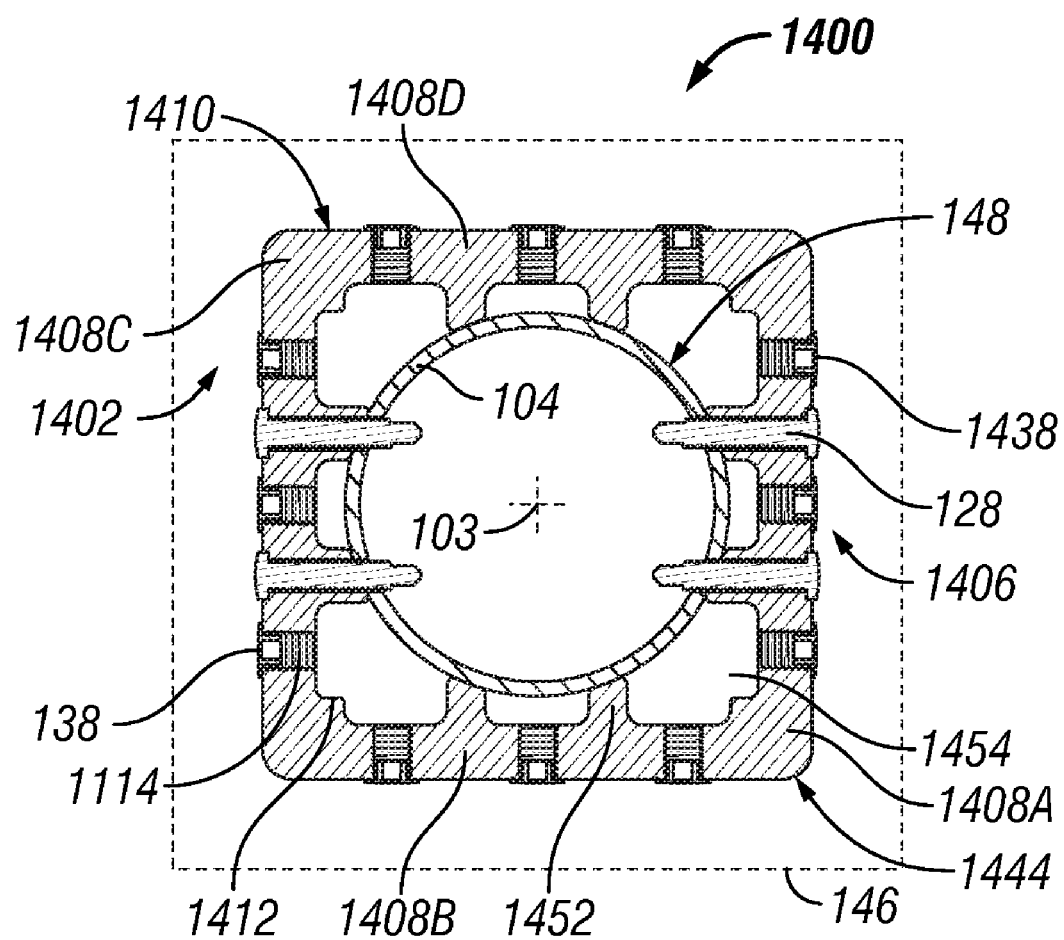
FIG. 14 is a cross-sectional drawing of the post system of FIG. 13, showing a tube segment with a square shape and an interior core with a circular shape on a cross-sectional, axial plane, in accordance with some embodiments.

Referencing FIG. 14, in some embodiments, internal core post 104 defines a circular shape 148 in cross-sectional plane 146. In further embodiments, the exterior surface 1410 of the sectioned tube segment 1406 defines a square exterior shape 1444 in the cross-sectional plane 146. In some embodiments, sectioned tube segment 1406 has four walls (i.e., sides) 1408A, 1408B, 1408C, 1408D. Otherwise, the structures shown are similar to those of FIG. 3.

Similar to FIG. 3, the structures shown in FIG. 14 include an interior surface 1412 of walls 1408A, 1408B, 1408C, 1408D. Ribs 1452 protrude from interior surface 1412 to define a portion of internal channel 1454. Ribs 1452 center a portion of internal core post 104 within the internal channel 1454 of external post 1402.

The walls 1408A, 1408B, 1408C, 1408D of sectioned tube segment 1406 define internally threaded channels 1114 with plugs 1438 inserted in unused channels 1114. Mounting screws 128 pierce walls 1408A, 1408C and internal core post 104 to secure tube segment 1406 to internal core post 104.

Further referencing FIG. 13, in some embodiments, walls 1408 of tube segments 1406 define a plurality of channels 114. The channels are configured to mount an article (e.g., bracket 120 of FIG. 2) to exterior surface 1410 of a tube segment 1406. Some of the plurality of channels 114 are disposed within square rings 1430A, 1430B about central axis 103 of post system 1400 and about the respective first axis 152 of the respective tube segments 1406. In some embodiments, the channels 114 within the rings 1430A, 1430B are equally spaced along each wall of the respective tube segment 1406. In some embodiments, there are at least four channels in each of rings 1430A, 1430B of the respective tube segments 1406.

A tube segment 1406 is configured to couple with tube segment 1406E (shown in exploded and partial dotted line view). In some embodiments, this configuration includes coupling mechanism 1436. In some embodiments, coupling mechanism 1436 includes a locating ring that comprises upper lip 1434 (shown in dotted line) of tube segment 1406E, gasket 150, and lower lip 1432 of the lower tube segment 1406. Thus, tube segment 1406E is configured to be indirectly coupled with lower tube segment 1406 via upper lip 1434 and lower lip 1432 and with gasket 150 disposed between at least a portion of tube segment 1406E and a portion of lower tube segment 1406.

Referencing FIG. 15, a post system 1500 includes an internal core post 1504 and an external post 1502. Similar to the discussion with respect the embodiments shown in FIGS. 1-4, internal core post 1504 is configured to be partially disposed within external post 1502 about central axis 103 to form post system 1500. External post 1502 comprises tube segments 1506. In the embodiment shown, tube segment 1506 is a cylinder that defines a perimeter 118 about central axis 103.

Unlike internal core post 104 of FIG. 1, internal core post 1504 is square-shaped in an axial plane (not shown) and has four equal walls 1592A, 1592B, 1592C, 1592D. Otherwise, the embodiments shown with reference to FIG. 15 may be similar to those described with reference to FIGS. 1 through 4.

Referencing FIG. 16, a post system 1600 includes an internal core post 104 and an external post 1602. Similar to the discussion with respect the embodiments shown in FIGS. 1-4, internal core post 104 is configured to be partially disposed within external post 1602 about central axis 103 to form post system 1600. External post 1602 comprises tube segments 1606. In the embodiment shown, internal core system 104 is an elongated cylinder.

Unlike tube segments 106 of FIGS. 1 through 4, tube segment 1606 is triangular-shaped in an axial plane (not shown) and has three equal walls 1608A, 1608B, 1608C. In some embodiments walls 1608A-C of tube segments 1606 define a plurality of channels 114. The channels are configured to mount an article (e.g., bracket 120 of FIG. 2) to exterior surface 1610 of a tube segment 1606. Some of the plurality of channels 114 are disposed within triangular rings 1630A, 1630B about central axis 103 of post system 1600 and about the respective first axis 152 of the respective tube segments 1606. In some embodiments, the channels 114 within the rings 1630A, 1630B are equally spaced along each wall of the respective tube segment 1606. In some embodiments, there are at least nine channels in each of rings 1630A, 1630B of the respective tube segments 1606.

Figure 17:
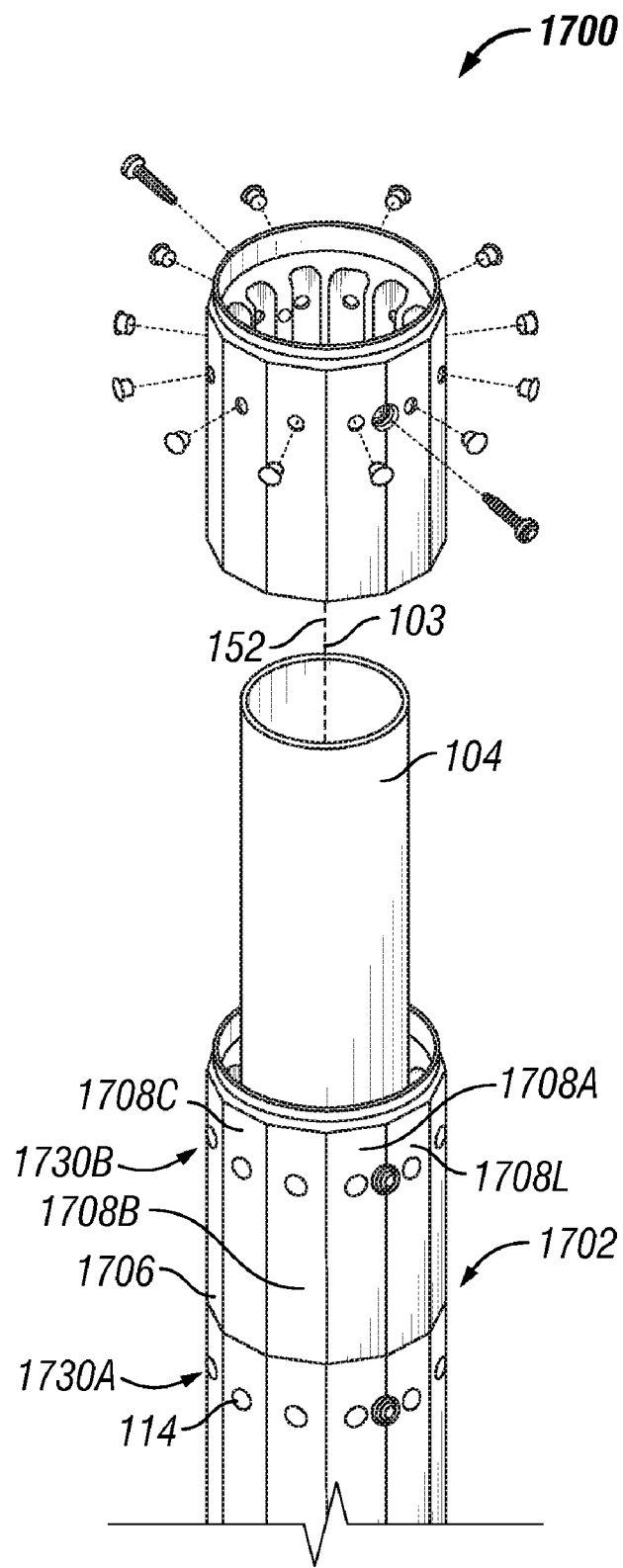
FIG. 17 is a partially exploded perspective view of a portion of post system, showing a tube segment with a twelve-sided opening and an interior core post with a circular-shaped opening, in accordance with some embodiments.

Referencing FIG. 17, a post system 1700 includes an internal core post 104 and an external post 1702. Similar to the discussion with respect the embodiments shown in FIGS. 1-4, internal core post 104 is configured to be partially disposed within external post 1702 about central axis 103 to form post system 1700. External post 1702 comprises tube segments 1706. In the embodiment shown, internal core system 104 is an elongated cylinder.

Unlike tube segments 106 of FIGS. 1 through 4, tube segment 1706 has a twelve-sided shape in an axial plane (not shown) and has twelve equal walls 1708A, 1708B, 1708C—1708L. In some embodiments walls 1708A-L of tube segments 1706 define a plurality of channels 114. The channels are configured to mount an article (e.g., bracket 120 of FIG. 2) to exterior surface 1710 of a tube segment 1706. Some of the plurality of channels 114 are disposed within twelve-sided rings 1730A, 1730B about central axis 103 of post system 1700 and about the respective first axis 152 of the respective tube segments 1706. In some embodiments, one of channels 114 in each of rings 1730A, 1730B is disposed on each equally-sized wall of the respective tube segment 1706. Thus, in some embodiments, there are at least twelve channels in each of rings 1730A, 1730E of the respective tube segments 1706.

The foregoing embodiments and advantages are merely exemplary and are not to be construed as limiting the present invention. Those skilled in the art can appreciate from the foregoing description that the techniques and structures of the embodiments of the invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, the specification, and the following claims.

What is claimed is:

1. A post system comprising:
   at least two tube segments, a first and a second tube segment of the at least two tube segments each having, respectively, at least one wall and a first axis, wherein each of the at least one walls of each of the first and the second tube segments:
   extends along and defines a perimeter about its respective first axis;
   has an interior and an exterior surface relative to its respective first axis;
   defines a plurality of at least four channels that are configured for coupling an article with its respective tube segment and that are arranged within at least one respective ring; and
   wherein the first and second tube segments are configured to be coupled with one another to form an exterior post with 1) the respective first axis's of the tube segments being aligned to form a central axis of the exterior post; 2) the respective interior and exterior surfaces of the first and second tube segments defining an interior and an exterior surface of the exterior post; and 3) the at least one rings are disposed about the central axis.

2. The post system of claim 1, wherein when the first and second tube segments are coupled with one another, the exterior surface of a given one of the first and second tube segments defines a circular shape in a cross-sectional plane orthogonal to the central axis.

3. The post system of claim 1 further comprising at least one gasket and wherein the first and second tube segments are configured to be indirectly coupled with one another with the at least one gasket disposed between at least a portion of the first tube segment and a portion of the second tube segment.

4. The post system of claim 1, further comprising:
   an interior core post;
   ribs that protrude from the respective interior surfaces of each of the at least one walls of each of the first and the second tube segments, and wherein:
   the ribs define an internal channel of the exterior post when the first and second tube segments are coupled with one another; and
   at least a portion of the interior core post is configured and sized to be partly disposed within the internal channel when the first and second tube segments are coupled with one another, the ribs being shaped to center the portion of the interior core post within the internal channel and about the central axis of the exterior post.

5. The post system of claim 4, wherein the ribs are separate structures coupled with the respective interior surfaces.

6. The post system of claim 4 wherein, when the first and second tube segments are coupled with one another and the portion of the interior core post is disposed within the internal channel:
the interior core post defines a circular shape in an axial cross-sectional plane that is orthogonal to the central axis and that axially cross-sections a given tube segment of the first and second tube segments; and
the exterior surface of the given tube segment defines a square shape in the cross-sectional plane.

7. The post system of claim 4, wherein:
the first and second tube segments each comprise a sleeve and a mounting ring, the sleeve and the mounting ring being configured to be coupled with one another to form their respective tube segment;
the interior surfaces of each of the first and second tube segments include an interior surface of their respective mounting ring; and
the ribs protrude from the interior surfaces of the mounting rings.

8. The post system of claim 4, further comprising at least two fastening mechanisms to secure each of the at least one walls of the first and second tube segments to the interior core post when the interior core post is partly disposed within the internal channel of the exterior post.

9. The post system of claim 1, wherein the first and second tube segments each comprise a sleeve and a mounting ring, the sleeve and the mounting ring configured to be coupled with one another to form the first or the second tube segments.

10. The post system of claim 9, wherein:
the at least one wall of a given tube segment of the first and second tube segments, includes a wall of the sleeve of the given tube segment, and
the wall of the sleeve of a given tube segment covers the mounting ring of the given tube segment in that the mounting ring is not visible from a view of the exterior of the post system.

11. The post system of claim 9, wherein when the first and second tube segments are coupled with one another, with their respective first axis's aligned, the mounting rings are separated from one another longitudinally, by at least a portion of a sleeve.

12. The post system of claim 9, wherein, when the respective sleeve and mounting ring are coupled with one another, the sleeve does not cover the mounting ring.

13. The post system of claim 1, wherein the first and second tube segments are capable of being coupled to one another with the plurality of at least four channels of each tube segment being disposed within at least one respective ring, with each ring being disposed in an axial plane orthogonal to the central axis of the external post.

14. The post system of claim 1, wherein:
the at least two tube segments comprises the first, the second, and a third tube segment;
the third tube segment having at least one wall and a first axis, the at least one wall of the third tube segment extends long and defines a perimeter about the first axis of the third tube segment and defines a plurality of at least four channels that are arranged within at least one ring; and
the first, second and third tube segments are configured to be coupled with one another longitudinally, to form an exterior post along a common axis, whereby the at least one ring of the third tube segment is disposed about the central axis and the rings of the at least one rings of the tube segments are separated along the common axis of the exterior post by a fixed spaced interval.

15. The post system of claim 14, wherein the rings of the at least one rings of the tube segments are disposed along respective axial planes orthogonal to the common axis.

16. The post system of claim 1, further comprising:
a bracket shaped to mount to the exterior surface of a given one of the first and the second tube segments, the bracket defining at least one bracket channel that extends through at least a portion of the bracket, the at least one bracket channel capable of being aligned with at least one of the at least four channels of the given tube segment when the bracket is mounted to the exterior surface of the given tube segment; and
a bracket fastening mechanism configured to affix the bracket to the exterior surface of the given tube segment when the bracket is mounted to the exterior surface.

17. The post system of claim 1, wherein the plurality of at least four channels within the at least one ring of each of the at least one walls of the first and second tube segments is a plurality of at least twelve channels within a given ring of the at least one rings, and the channels are spaced within the given ring about the respective first axis 30 degrees apart.

18. A post system comprising:
a exterior post with at least one wall extending lengthwise about a central axis, the at least one wall defining a plurality of channels that are configured for coupling articles with the at least one wall of the exterior post, the plurality of channels being arranged in at least three rings, the rings defining a perimeter about the central axis and being disposed at fixed intervals along the central axis within respective axial planes that are orthogonal to the central axis;
a bracket shaped to be mounted to the exterior surface of the exterior post, the bracket defining a bracket channel that aligns with a given channel of the plurality of channels of the exterior post when the bracket is mounted to the exterior surface of the exterior post; and
a bracket fastening mechanism configured to affix the bracket to the exterior surface of the exterior post when the bracket is mounted to the exterior surface.

19. The post system of claim 18, further comprising an interior core post extending lengthwise and wherein:
the exterior post comprises at least three tube segments coupled with one another to define the exterior post, the tube segments each comprising an interior surface with respect to the central axis, the interior surfaces of the tube segments each having ribs protruding therefrom to jointly define an internal channel of the exterior post; and
the interior core post partly disposed within the internal channel and centered within the internal channel and about the central axis by the ribs.

20. The post system of claim 19, further comprising an end cap coupled with an end of the exterior post, the end being along the length of the central axis.

21. The post system of claim 19, further comprising exterior surfaces of the coupled tube segments and wherein:
the interior core post defines a circular shape on an axial cross-sectional plane that is orthogonal to the central axis and that cross-sections a given one of the at least three coupled tube segments; and
the exterior surface of the given tube segment defines a square shape on the cross-sectional plane.

22. The post system of claim 19, further comprising at least three fastening mechanism that fasten the interior core post to the at least three tube segments.

* * * * *